Figure 2:
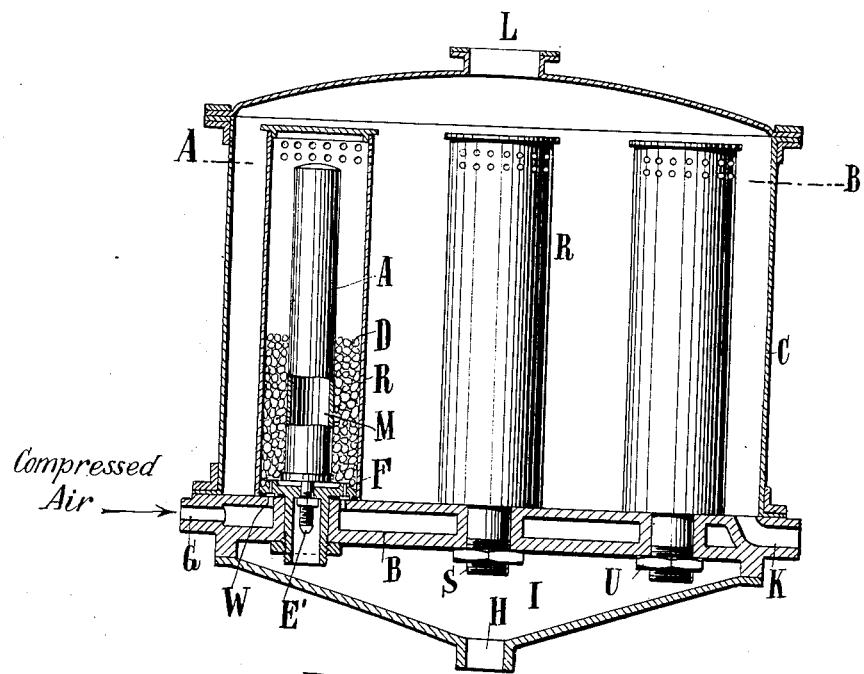

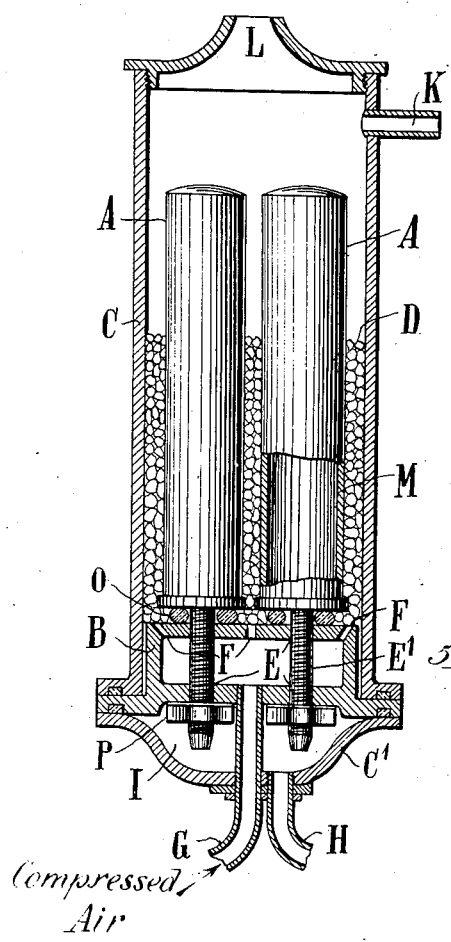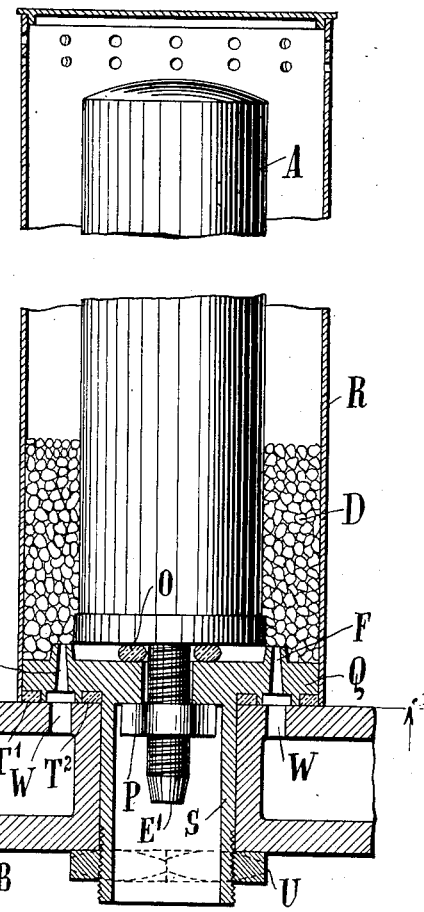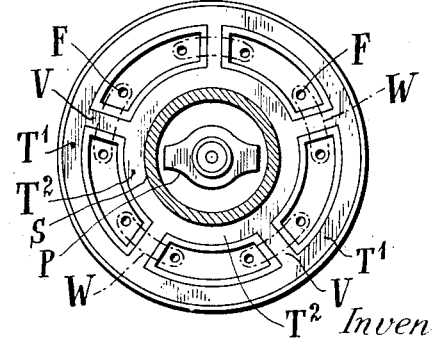

A. ENDLER.
FILTER.
APPLICATION FILED APR. 21, 1909.

930,167.

Patented Aug. 3, 1909.
2 SHEETS—SHEET 2.

Witnesses:
Fred White
René Bruine

Inventor:
Albert Endler,
By his Attorneys

UNITED STATES PATENT OFFICE.

ALBERT ENDLER, OF CELLE, GERMANY.

FILTER.

No. 930,167.    Specification of Letters Patent.    Patented Aug. 3, 1909.

Application filed April 21, 1909. Serial No. 491,261.

*To all whom it may concern:*

Be it known that I, ALBERT ENDLER, a subject of the Emperor of Germany, residing at 8ᵇ Kleine Hehlenerstrasse, Celle, Germany, have invented certain new and useful Improvements in Filters; and I do hereby declare the following to be a full, clear, and exact description of the invention.

My invention relates to filters and a primary object is to provide improved filtering apparatus having solid filtering bodies and means for readily cleaning the same.

When liquids filter through solid filtering bodies composed of porous porcelain, clay, kieselguhr and asbestos, or other artificial stones, whose pores are so fine that the impurities do not penetrate deeply into the filtering mass, the impurities are deposited on the surface of the filtering bodies in an impermeable layer, but also penetrate like plugs into the pores of the outermost surface. For completely restoring the original efficiency of solid filtering bodies it is therefore necessary, that, firstly, the filtering mass shall have only that degree of hardness which permits a portion of slight thickness to be removed each time it is cleaned, and, consequently, that the surface be renewed each time of cleaning. It will be readily understood that this slight removal of the material and renewal of the surface is not to be obtained by simple counter-pressure. Also heretofore in those filters in which air or water under pressure was forced through the solid filtering bodies in a direction opposite to that of filtration, the filtering bodies frequently had to be removed and cleaned by abrasion. Therefore they cannot be cleaned perfectly by counter-rinsing alone. None of the numerous mechanical cleaning devices have proved successful in practice.

In the improved apparatus described hereinafter the dirt is removed and the surface renewed by surrounding the filtering bodies with a layer of loose sharp-edged material, for example sand, gravel, ground slags, glass, porcelain, small pieces of coal and the like, and by imparting an eddying motion to this surrounding material after filtration is finished, using for that purpose compressed air which is blown under pressure directly into the cleaning material through nozzles arranged outside the filtering body. In this manner the individual particles are thrown with force against the wall of the filtering body and carry away the mud settled there which is removed simultaneously from the apparatus by rinsing with water. The loose material exercises on the filtering cylinder a grinding action, like that of a sand blast and in this manner renews the surface. For aiding the action the interior of the filtering cylinder can be exposed to pressure, for example of air, water or steam, in addition, in a manner known heretofore, and the air or the like under pressure endeavoring to pass out through the pores of the filtering mass loosens the layer of ooze or mud deposited on the surface of the filtering cylinder, so that this layer can be more readily removed by the impact of the surrounding loose particles.

In the present apparatus the perforated, fixed or movable plate used in the well-known Berkefeld filter for example, to which plate the filtering cylinders are attached, is replaced by a perforated double plate, whose holes serves for attaching the respective cylinders. The plate lying next to the filtering cylinders themselves is provided in addition with a number of somewhat fine perforations or nozzles, from which alone the air, introduced under pressure into the space between the two plates, can escape.

In order that my invention may be clearly understood I will now describe the same with reference to the accompanying drawing in which several embodiments are represented by way of example.

Figure 3:
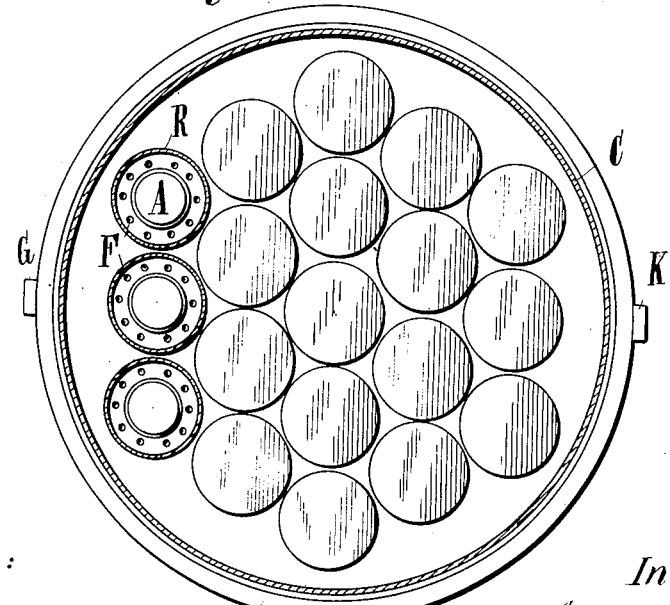

In said drawings, Figure 1 is a vertical sectional elevation through one form of my improved filter, and Figs. 2 and 3 are a vertical sectional elevation, and a horizontal section approximately on the line A—B in Fig. 2, respectively, of a modified form. Fig. 4 is a vertical sectional elevation and Fig. 5 an underside plan view of an individual filtering body on an enlarged scale, the plane being indicated by the line 5—5 of Fig. 4.

Referring to the drawing, and firstly particularly to Fig. 1, a constructional form of the apparatus is here shown which is possible when only a few filtering cylinders are employed. The filtering cylinders A are attached to a double plate B which may be removably or permanently connected with the case C of the filter. The cylinders are surrounded by a sharp-edged material D. The top and bottom plates or disks comprising the double plate B are provided with holes E in which the discharge pipes E' of the cylinders are fitted tightly by means of nuts P and india-rubber rings O as clearly shown. The top disk of the double plate has in addition the fine orifices or nozzles F. The water to be filtered enters in known manner into the filter through the pipe K, penetrates the porous cylinder A and flows off through the pipe H. Compressed air from an air compressor enters under pressure through the pipe G into the chamber in the double plate B, rises through the nozzle F and imparts to the material D an eddying motion. Owing to the impact of the particles, a grinding action on the surface of the filtering cylinder takes place, the mud deposited thereon is carried away and removed from the apparatus by rinsing water which flows in through the pipe K, while the air escapes through the outlet L. When desired the cleansing action can be increased by allowing compressed air, water or steam under pressure to pass through the pipe H into the chamber I' between the bottom cover C' of the case and the double plate, thence through the pipes $E^1$ into the chambers M in the filtering cylinders and then through the porous walls of the latter. In this manner the mud deposited on the surface of the filtering cylinders is loosened.

In a filter containing a somewhat large number of cylinders a large quantity of cleaning material would be required to fill the spaces between the filtering bodies, and the pressure required to set the entire weight of the cleaning material into uniform motion sufficient for the desired purpose would be enormous.

In one form of the apparatus (Figs. 2 and 3) designed to overcome these difficulties, a jacket is placed around each single filtering body. The space between the jacket and filtering body is made only so large that just the necessary quantity of cleaning material has room and can move freely. Owing to this arrangement the cleaning material when set in motion is forced to move in a certain direction, in this way scouring the filtering cylinder and causing the dirt collected thereon to be rubbed away, the latter being then removed from the apparatus by rinsing water which is simultaneously supplied thereto. By means of a peculiar shape and arrangement of the jackets around the individual filtering bodies, it is simultaneously possible to control the effectiveness of the individual cylinders while working, and to exchange any which possibly may have been injured, without it being necessary to dismember the entire apparatus or to remove all the purifying material from it. At the same time a peculiar arrangement of slits and nozzles and a very special form of washers allow the uniform distribution of the compressed air forced into the apparatus.

Figs. 2 and 3 show the arrangement of a somewhat large number of filtering bodies in a common case, and the arrangement of the jackets surrounding each individual filtering body, and that of the slots and nozzles and the form of packing. For the sake of distinctness one single filtering body is shown on an enlarged scale in Figs. 4 and 5, the plan view in Fig. 5 showing the face of the joint. Each filtering body A is packed tightly in known manner with a washer O and nut P in the bottom Q of each individual surrounding jacket R. The bottom of the jacket has an annular extension S which can be passed through holes in the double bottom B forming the air admission chamber, the india-rubber ring $T^1$ $T^2$ and nut U making a tight joint.

The bottom of the jacket contains, besides the hole for the discharge pipe $E^1$ of the filtering cylinder, a number of nozzles F, and the under side is cut away to receive a packing plate $T^1$ $T^2$ which, owing to segment-like incisions, has the form of two concentric rings connected by a number of radial bars.

Fig. 5 is a bottom plan view showing the bottom of the jacket and simultaneously the peculiar form of the packing plate having the concentric rings $T^1$ and $T^2$ connected by the radial bars V. In the segmental incisions the nozzles F are indicated and also the position of the slots W by dotted lines. It is evident that owing to their lengths the slots W can never be covered over, but will always register with two of the nozzles, and will secure a uniform distribution of the compressed air.

The apparatus works as follows:—The water to be filtered, which enters through the socket K, passes through the holes in the upper end of the jackets R on the filtering cylinders and through the wall of which it is forced by the pressure of the main or pump. The filtered water flows through the socket S into the chamber I in the bottom of the apparatus (Fig. 2) and is led away thence through the socket H. The impurities remain on the surface of the cylinders A. When the latter have become clogged to such an extent that sufficient water is no longer filtered, filtration is stopped; air or other gas, steam, water or mixtures of liquid and gaseous substances are then introduced under pressure through the pipe G to the chamber B. The compressed air &c. is forced through the slots W and nozzles F into the granular scouring material D surrounding the filtering cylinders A and owing to its expansion and buoyancy imparts a violent eddying motion to the granular material. On account of the jackets the particles cannot escape laterally but must move over the faces of the filtering bodies. In this manner the ooze or mud settled on the surface of the filtering bodies is removed and simultaneously the filtering cylinder is scoured and ground so as to renew its surface. The packing rings $T^1$ $T^2$ prevent the pressure medium introduced for moving the cleaning mass from escaping laterally and also prevent filtered and nonfiltered water mixing.

I claim:

1. In a filter, the combination of an outer case having an inlet, with a perforated double plate inclosing a chamber having an inlet attached to said case, a hollow filtering member in said case and attached to said double plate, loose granular material between said member and the case, the perforations in said double plate connecting the chamber in the same with the space between said member and the case, as set forth, for the purpose specified.

2. In a filter, the combination of an outer case having an inlet, with a perforated double plate inclosing a chamber having an inlet attached to said case, a hollow filtering member in said case and attached to said double plate, a jacket fitting said double plate and surrounding said member, loose granular material between said member and the jacket, the perforations in said double plate connecting said chamber with the space between said member and said jacket, as set forth, for the purpose specified.

3. In a filter, the combination of an outer case having an inlet, with a perforated double plate inclosing a chamber having an inlet attached to said case, a hollow filtering member in said case, a jacket fitting and attached to said double plate and surrounding said member, said jacket having a bottom provided with nozzles attached to said double plate, means attaching said member to the bottom of said jacket, loose granular material between said member and said jacket, and a packing ring having segmental incisions registering with said nozzles and the perforations in said double plate, the perforations in said double plate connecting the chamber in the same by way of said nozzles with the space between said member and said jacket, as set forth.

4. In a filter, the combination of a perforated double plate inclosing a chamber, a jacket attached by its bottom to said plate, the bottom of said jacket having nozzles corresponding with the perforations in said plate, and a packing plate having segmental incisions arranged, substantially as shown, between said plates and the bottom of the jacket, for the purpose specified.

In testimony that I claim the foregoing as my invention I have signed my name in presence of two subscribing witnesses.

ALBERT ENDLER.

Witnesses:
ROBERT J. THOMPSON,
LUISE KATHER.